Patented July 1, 1947

2,423,262

UNITED STATES PATENT OFFICE 2,423,262

COMPOUNDS HAVING THE FORMULA

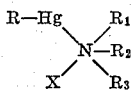

Frank J. Sowa, Cranford, N. J.

No Drawing. Application August 28, 1943,
Serial No. 500,449

21 Claims. (Cl. 260—434)

1

This application is a continuation-in-part of application Serial No. 443,304, filed May 16, 1942.

This invention relates in general to germicides and in particular to compositions for treating materials such as textiles, paper, leather, rubber, plastics, coating compositions, soaps, cosmetics, and the like, to render them bacteriostatic and fungistatic and to methods and products in which such compositions are used.

Germicides for use on materials such as textiles, paper, leather, rubber and the like must be characterized by a number of essential properties, the combination of which in a single chemical compound is difficult to attain. The most essential requisite is that the germicide should have a high toxicity to fungi and bacteria in very dilute solution so that the maximum protection will be obtained with a minimum quantity of material. Consequently, it is essential that a germicide for treating such material should be soluble in a common, inexpensive, readily available solvent, preferably soluble in water or in ethyl alcohol, methyl alcohol, and other common solvents. The third essential characteristics for germicides for such materials is that they must be non-irritating to the human skin when used in wearing apparel or in cosmetics. Other desirable characteristics in a germicide for such materials is that they should not substantially discolor, or impart undesirable aroma or alter the physical properties such as hand or tensile strength of the treated materials. They should be stable upon a long exposure to sunlight and should not chemically react with the treated materials in an adverse manner. Finally, the treated fabric should exhibit a substantial laundry fastness. The combination of all these properties in a single chemical compound is obviously difficult of attainment.

It is the general object of the present invention to provide a germicide which is characterized by having high toxicity to bacteria and fungi in low concentration, solubility in common solvents and the treated fabrics should not produce any irritation of the skin.

It is a specific object of the invention to provide a composition for treating textiles, paper, leather, rubber, and the like to render such materials highly bacteriostatic and fungistatic and which cannot be readily removed by washing.

Another specific object of the invention is to provide compositions and methods for producing materials which possess lasting bacteriostatic and fungistatic properties by reason of the conversion of water soluble compositions to water insoluble compositions.

Other objects of the invention will in part be obvious and will in part appear hereinafter.

According to the present invention, a germicide having all the desired characteristics is produced from organic mercurial compounds which contain one or more mercury atoms attached directly to a carbon containing ring structure and having the following general formula:

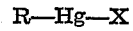

in which R is an aromatic or heterocyclic ring structure to a carbon atom of which the mercury is attached and X is an anion of an inorganic or organic acid. The organic mercury salts having the formula R—Hg—X are old in the art and no claim is made herein to such salts per se.

Typical organic mercuric salts which may be used in the practice of the present invention are salts of inorganic or organic acids such as boric, nitric, sulfuric, acetic, gluconic, butyric, lactic, malic, and the like. Aryl mercury hydroxides are equally applicable. Specific examples of some of the mercuric salts used in the invention are phenyl mercuric acetate, phenyl mercuric lactate, phenyl mercuric gluconate, phenyl mercuric hydroxide, tolyl mercuric acetate, xylyl mercuric acetate and pyridyl mercuric acetate. Furthermore, polymercuriated compounds such as phenylene dimercury acetate may be used and are here included among the compounds referred to herein as having the general formula

Most of the organic mercury salts having the formula R—Hg—X are relatively insoluble in water, but as described in application Serial No. 489,244 filed May 31, 1943, their solubility in aqueous solutions is greatly increased if ammonium hydroxide and an ammonium salt are present in the solution. Therefore, I frequently use such ammoniacal solution of the salts in the methods herein described.

Applicant has discovered that the organic mercury salts referred to above react with amines to form new addition products. This reaction appears to be general in character as evidenced by the fact that phenyl mercuric acetate when added to cyclohexylamine, morpholine, pyridine or 8-hydroxyquinoline is found to enter into solution momentarily and then to form a precipitate of an insoluble compound. In the case of cyclohexylamine the resulting product melts at about 165° C. indicating that a new chemical compound has been formed. Moreover, the reaction in each case is exothermic thus further indicating that chemical combination of the reactants has occurred. Applicant has further discovered that if the amines used are themselves water soluble and hydroxylated the resulting addition products are readily soluble in water and common solvents. It is these new water soluble addition products and methods of producing and using the same to which the present invention relates.

Products of the present invention are produced by a reaction which may be represented by the following equation:

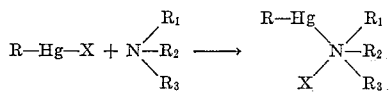

wherein R is a cyclic organic radical and preferably an aryl radical, X is an anion and $R_1$, $R_2$ and $R_3$ are hydrogen, hydroxyl or organic radicals at least one of which is or contains a hydroxyl group.

Any water soluble hydroxyalkylamine may be used in producing compounds in accordance with the present invention, and by way of example but not by way of limitation, reference is made particularly to triethanolamine, diethanolamine, monoethanolamine, trimethanolamine and monoisopropanolamine.

In the case of phenyl mercuric acetate and triethanolamine, which are typical of the reacting compounds which may be employed, the reaction by which the water soluble addition composition is produced may be represented by the following equation:

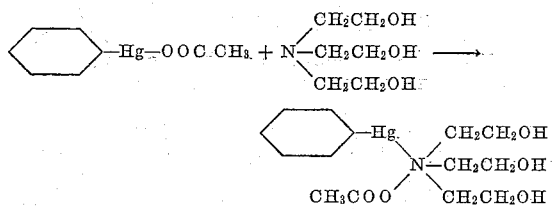

This composition may be produced by simply dissolving phenyl mercuric acetate in triethanolamine at room temperature or with moderate heating. The reaction is exothermic and results in the formation of a mushy, nearly white product of waxy-crystalline character. The addition product has a melting point of approximately 75° C. and is much more soluble in water and alcohol and much less soluble in hot benzene than is phenyl mercuric acetate. The solubility of this compound in water is increased by addition of triethanolamine to the water or by the use of an excess of triethanolamine in forming the addition product.

In place of triethanolamine any other hydroxylalkylamine may be used. Similarly, other organic mercury salts having the general formula R—Hg—X may be used and ammoniacal solutions or solutions of these salts in hydroxyalkylamines may be employed.

Thus, by way of further illustration, equal molar proportions of phenyl mercuric acetate and monoisopropanolamine were dissolved in methanol and solution effected by means of a high speed mixer with a resulting rise in temperature during solution. The clear yellowish liquid produced was evaporated in vacuo, and formed crystals having melting point of 135° C. Products obtained when using monoethanolamine and diethanolamine formed thick yellowish oils. Other addition products have been produced when using triethanolamine and tolyl mercuric acetate, xylyl mercuric acetate, pyridyl mercuric acetate, phenyl mercuric lactate and phenyl mercuric gluconate. Because of the relative insolubility of certain mercury salts, even when ammonium salts and ammonia are used, it is usual to avoid the use of the most insoluble compounds, such as phenyl mercuric chloride, cyanide and nitrate.

The new products are highly toxic to bacteria and fungi and have been widely used in treating textiles, leather, paper, paints, rubber and other products to render them bacteriostatic, fungistatic and mildew resistant.

For most purposes, it is desirable to obtain and use the products in the form of solutions since they are then easier to handle and are not so concentrated that waste of the product will occur by excessive use in commercial operations. One method which has been used extensively in producing products in accordance with the present invention is as follows:

*Example I*

1500 grams of phenyl mercuric acetate are mixed with 3750 cc. of triethanolamine and 500 cc. of 80% lactic acid. The resulting product is thereafter diluted with water to produce 5 gallons of solution and 25 grams of citric acid are dissolved therein. If desired a part, say one-half of the water may be mixed with the triethanolamine before adding the phenyl mercuric acetate thereto. The lactic and citric acids are not essential to the process but are found to stabilize the resulting solution and prevent the formation of precipitates on long standing of the solution.

The solution thus obtained may be diluted with any desired amount of water for various commercial applications and uses thereof, and it may be used in the treatment of textiles, yarn, fibers, paper, leather, rubber, plastics, paints, coating compositions, soaps, cosmetics, and many other products to render them bacteriostatic, fungistatic or mildew resistant.

A typical application of the invention in treating fabric is as follows:

*Example II*

17 grams of the solution obtained in Example I are added to each gallon of water in a textile treating bath. Cotton fabric is then passed through the bath and is run wet to squeeze rolls adjusted to leave an amount of liquid in the fabric equal to the dry weight thereof. The fabric is then said to have "100% pick up." Thereafter the fabric is dried on calender rolls or a tenter frame running through an oven or in any other suitable way. As brought out in application Serial No. 489,707 filed June 4, 1943, heating of the novel addition product and heating of the fabric after treatment with the addition product, results in the formation of diphenyl mercury in and on the fabric. Since diphenyl mercury is almost completely insoluble in water and other common solvents, the fabric is rendered permanently bacteriostatic, fungistatic and mildew resistant.

Instead of heating the fabric it may be treated with a sodium chloride or other salt solution or agent to form a water insoluble phenyl mercuric compound such as phenyl mercuric chloride, thiocyanate or a product of the type described in application Serial No. 497,548, filed August 5, 1943. The fabric may also be treated in other ways, for example, as described in application Serial No. 443,304, filed May 16, 1942, to combine with cellulose of the fabric or form an insoluble reaction product in and on or with the fibers of the fabric so as to render it permanently bacteriostatic and fungistatic and laundry resistant.

In carrying out the present invention it is not necessary that the mercury salt and amine be mixed together in any particular order and therefore a solution of the mercury salt may be added to a bath containing the amine to produce the addition product in the bath or the reactants may be brought together in any other desired manner.

Instead of applying the germicidal agent by itself to fabric it may be used in conjunction with any of the usual textile finishes such as starch finishes, water repellent wax emulsion finishes, "permanent" finishes such as cellulosic or urea formaldehyde finishes, or the like. Typical procedure when using products of the present invention to provide a germicidal permanent finish on a fabric is as follows:

Example III 17 grams of the solution of Example I are added to each gallon of a bath containing 4% of alkali soluble cellulose ether and 7% of caustic soda. This bath is padded onto the fabric and the fabric then is passed through squeeze rolls to provide "100% pick-up." Thereafter the fabric is passed through dilute sulfuric acid to coagulate the finish and retain the germicidal product therein. The fabric is finally washed and dried. If the product is heated after coagulation of the finish diphenyl mercury is formed in situ whereas treatment of the fabric with a salt solution after coagulation of the finish will cause the insoluble phenyl mercury chloride to be produced and retained by the finish.

In place of the cellulose ether finish of the preceding example a cellulose finish such as an alkaline sodium zincate or stannate solution of the cellulose may be used. Similarly, other conventional textile finishing methods may be used to render waterproof or other finishes bacteriostatic or fungistatic. Moreover, if the textile finish or both contains triethanolamine or other water soluble amines it is only necessary to add a solution of the organic mercury compound to the bath to produce the germicidal agent therein.

Products of the present invention have many uses in addition to that of treating fabrics. Thus they have been applied with success to paper by adding them to the sizing and precipitating or forming an insoluble germicide therein by heating or otherwise. They have also been applied to leather and are particularly useful in footwear where the products serve to prevent the growth of bacteria and fungi. When applied to casein paints and other water paints and when applied to rubber the new products have been treated to form insoluble precipitates in the material and render the material permanently germicidal.

The invention is not limited to its applications in processes where insoluble precipitates are formed from the addition product. They have been added to the feed water in the beater of a paper making process to prevent the formation of slime. They also may be used in laundering and washing processes to prevent mildew and injury to fabrics or other materials by the action of bacteria or fungi. They may be added to soaps, cold creams or to lotions or employed in water solution as antiseptics or fungicides or elsewhere.

These and other applications and uses of products herein described and the methods of producing the products are cited by way of example since many further uses of the invention and other methods of producing the products will be evident or suggest themselves to those skilled in the art. In view thereof it should be understood that the products and processes herein particularly described are intended to be illustrative only and are not intended to limit the scope of the following claims.

I claim:

1. A water soluble germicidal and fungicidal compound having the composition represented by the formula

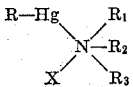

in which R is a cyclic non alicyclic group containing a carbon atom to which the mercury is attached, $R_1$ is a hydroxyalkyl group, $R_2$ and $R_3$ are selected from the group consisting of hydrogen, alkyl, and hydroxyalkyl, and X is an anion.

2. A water soluble germicidal and fungicidal compound having the composition represented by the formula

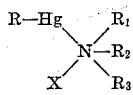

in which R is an aryl group, $R_1$ is a hydroxyalkyl group, $R_2$ and $R_3$ are selected from the group consisting of hydrogen, alkyl, and hydroxyalkyl, and X is an anion.

3. A water soluble germicidal and fungicidal compound having the composition represented by the formula

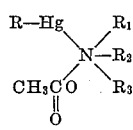

in which R is an aryl group containing a carbon atom to which the mercury is attached, $R_1$ is a hydroxyalkyl group, and $R_2$ and $R_3$ are selected from the group consisting of hydrogen, alkyl, and hydroxyalkyl.

4. A water soluble germicidal and fungicidal compound having the composition represented by the formula

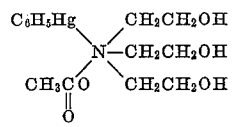

5. The method of producing a water soluble germicidal and fungicidal composition which comprises the step of contacting an organic mercury compound represented by the formula R–Hg–X, in which R is a phenyl group containing a carbon atom to which the mercury is attached and X is an anion, with a water soluble hydroxyalkylamine at substantially room temperature and atmospheric pressure.

6. The method of producing a water soluble germicidal and fungicidal composition which comprises the step of contacting an organic mercury compound represented by the formula R–Hg–X, in which R is an aryl group and X is an anion, with a water soluble hydroxyalkylamine at substantially room temperature and atmospheric pressure.

7. The method of producing a water soluble germicidal and fungicidal composition which comprises the step of contacting phenyl mercury acetate with a water soluble hydroxyalkylamine at substantially room temperature and atmospheric pressure.

8. The method of producing a water soluble germicidal and fungicidal composition which comprises the step of contacting phenyl mercury acetate with triethanolamine at substantially room temperature and atmospheric pressure.

9. The method of producing a water soluble germicidal and fungicidal composition which comprises the step of dissolving phenyl mercury acetate in water containing a molar excess of a water soluble hydroxyalkylamine.

10. The method of producing a water soluble germicidal and fungicidal composition which comprises the step of dissolving phenyl mercury acetate in water containing a molar excess of triethanolamine.

11. The method of stabilizing an aqueous solution of a water soluble germicidal and fungicidal composition produced by dissolving phenyl mercury acetate in water containing a molar excess of triethanolamine, which method comprises the step of adding lactic acid to said solution.

12. The method of stabilizing an aqueous solution of a water soluble germicidal and fungicidal composition produced by dissolving phenyl mercury acetate in water containing a molar excess of triethanolamine, which method comprises the step of adding lactic acid and citric acid to said solution.

13. A water soluble germicidal and fungicidal compound having the composition represented by the formula

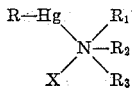

in which R is a phenyl group, $R_1$ is a hydroxyalkyl group, $R_2$ and $R_3$ are selected from the group consisting of hydrogen, alkyl, and hydroxyalkyl, and X is an anion.

14. A water soluble germicidal and fungicidal compound having the composition represented by the formula

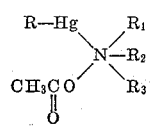

in which R is a cyclic group containing a carbon atom to which the mercury is attached, $R_1$ is a hydroxyalkyl group, and $R_2$ and $R_3$ are selected from the group consisting of hydrogen, alkyl, and hydroxyalkyl.

15. A new organo-mercurial compound which is readily soluble in water having a melting point of about 75° C. and characterized by its high toxicity to bacteria and fungi, which composition is capable of being produced by dissolving phenyl mercury acetate in an aqueous solution containing a molar excess of triethanolamine at substantially room temperature and under atmospheric pressure.

16. A liquid composition having germicidal and fungicidal properties comprising an aqueous solution containing the compound defined in claim 2.

17. A liquid composition having germicidal and fungicidal properties comprising an aqueous solution containing a water soluble hydroxyalkylamine and the compound defined in claim 2.

18. A liquid composition having germicidal and fungicidal properties comprising an aqueous solution containing triethanolamine and the compound defined in claim 2.

19. A liquid composition having germicidal and fungicidal properties comprising an aqueous solution, a water soluble hydroxyalkylamine, lactic acid, and the compound defined in claim 2.

20. A liquid composition having germicidal and fungicidal properties comprising an aqueous solution containing triethanolamine, lactic acid, and the compound defined in claim 2.

21. A liquid composition having germicidal and fungicidal properties comprising an aqueous solution containing triethanolamine, lactic acid, citric acid, and the compound of claim 4.

FRANK J. SOWA.

REFERENCES CITED

The following references are of record in the file of this patent:

UNITED STATES PATENTS

| Number | Name | Date |
| --- | --- | --- |
| 978,145 | Engelmann | Dec. 13, 1910 |
| 2,241,829 | Six | May 13, 1941 |